June 27, 1933.　　　　F. H. BENDER　　　　1,916,091
TRUCK
Filed July 21, 1931　　　　2 Sheets-Sheet 1
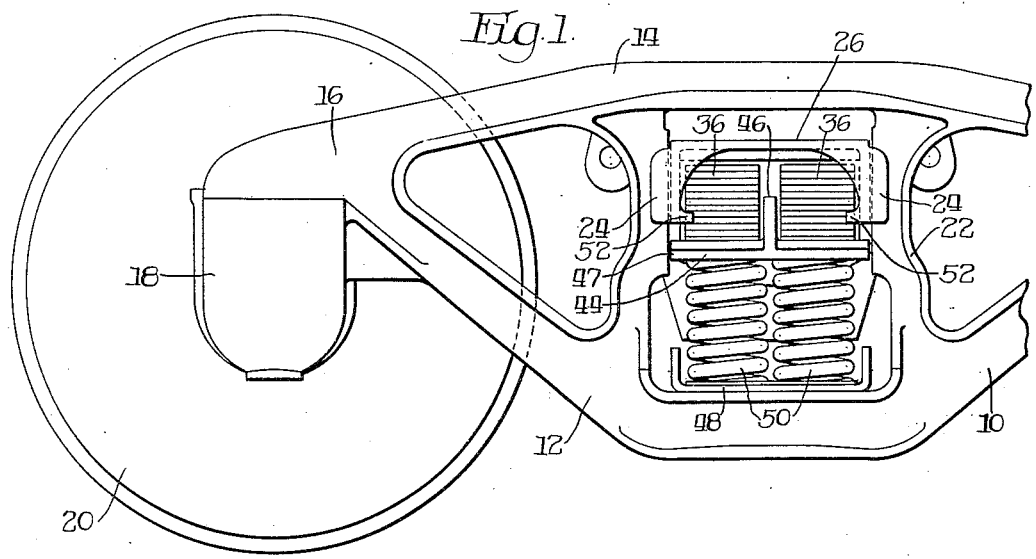
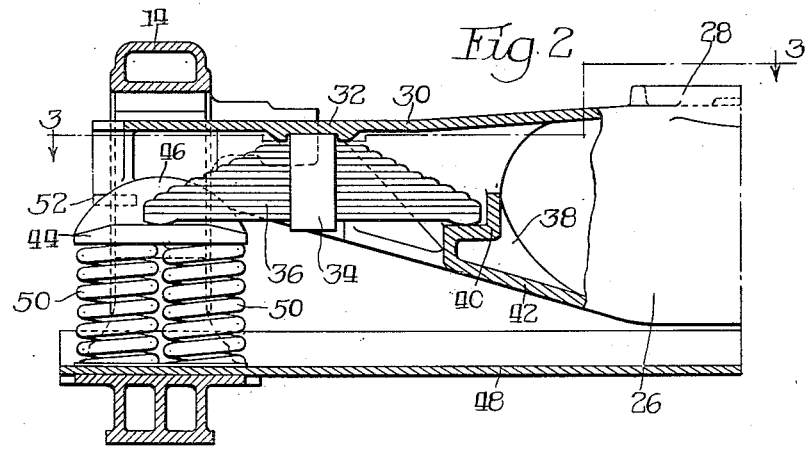
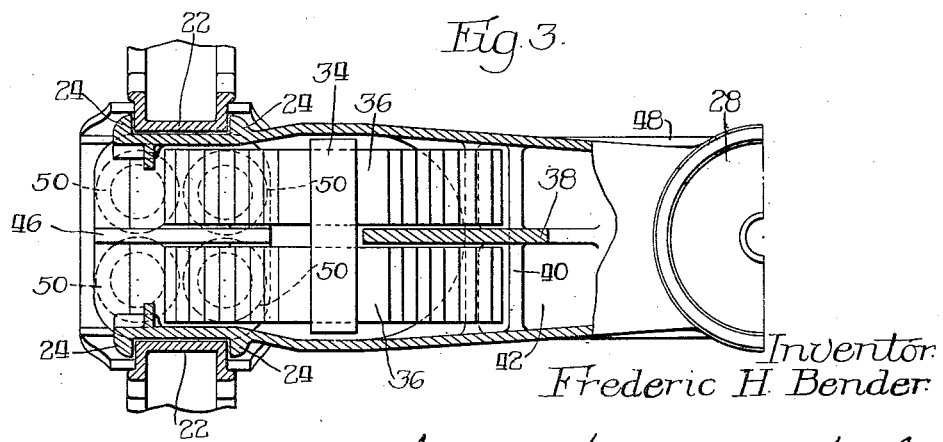
Inventor
Frederic H. Bender
By Wilkinson, Huxley, Byron & Knight
Attys

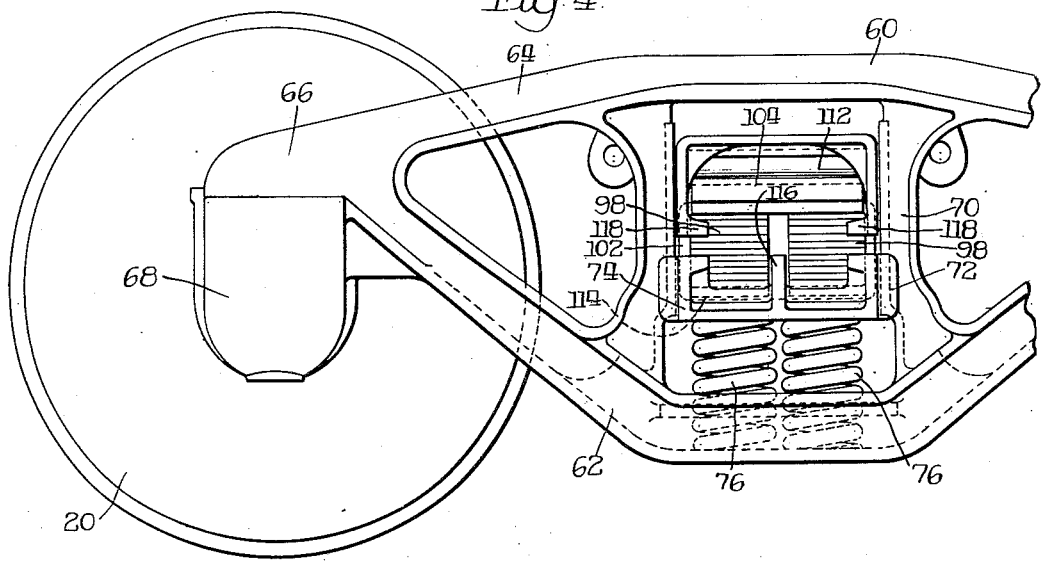
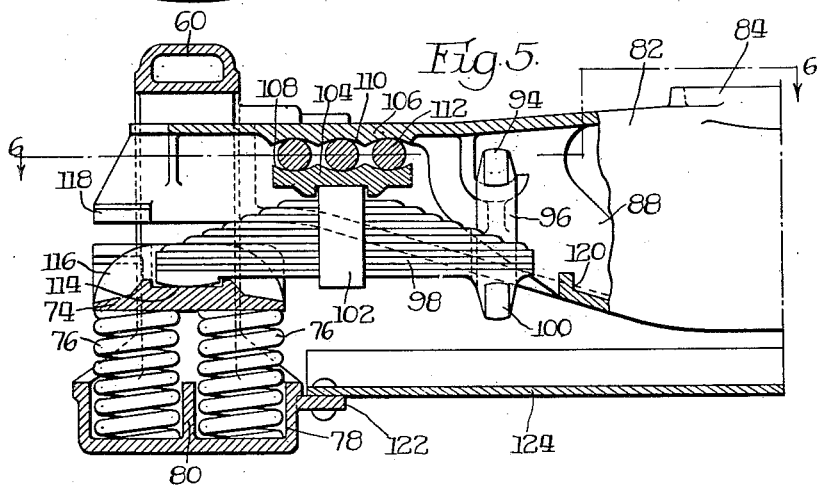
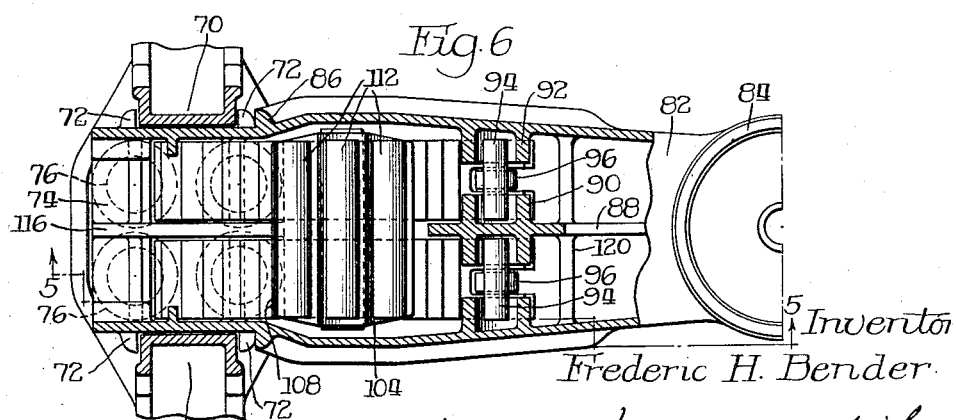

Patented June 27, 1933

1,916,091

UNITED STATES PATENT OFFICE

FREDERIC H. BENDER, OF CHICAGO, ILLINOIS, ASSIGNOR TO AMERICAN STEEL FOUNDRIES, OF CHICAGO, ILLINOIS, A CORPORATION OF NEW JERSEY

TRUCK

Application filed July 21, 1931. Serial No. 552,103.

This invention pertains to car trucks.

The conventional type of freight car truck conforming more or less closely to the standards of construction adapted by the A. R. A. Committee makes use of a bolster supported at each end by groups of coil or helical springs. One objection to this method of spring suspension is the fact that the period of oscillation of the helical springs may at times correspond to any regular interruptions of the smoothness of the track, such as, for instance, rail joints, thus causing the oscillations to build up until the resultant bouncing of the car may be such as to cause damage or derailment. Various means have been devised with the object of overcoming this building up of oscillation. Some of the means employ devices which offer frictional esistance to the free operation of the springs, but these dampening devices are objectionable in that they impair proper operation or cushioning qualities of the spring. Various arrangements of springs have been resorted to, and various combinations of springs of different character have been tried.

It is an object of this invention to provide a car truck which is inexpensive to make and maintain, fulfills all requirements of manufacture and service, and embodies good and improved riding qualities.

Another object of the invention is to provide a car truck wherein springs of different character are employed for load transmission.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary side elevation of the truck embodying the invention;

Figure 2 is a fragmentary transverse sectional elevation through the bolster and truck side frame;

Figure 3 is a fragmentary sectional top plan view through the truck construction taken substantially in the plane indicated by the line 3—3 of Figure 2;

Figure 4 is a fragmentary side elevation of a modified form of the truck embodying the invention;

Figure 5 is a fragmentary transverse sectional elevation through the bolster and truck side frame of the structure shown in Figure 4, and taken substantially in the plane indicated by the line 5—5 of Figure 6;

Figure 6 is a fragmentary sectional top plan view through the truck construction taken substantially in the plane indicated by the line 6—6 of Figure 5.

Referring first of all more particularly to the construction shown in Figures 1 to 3 inclusive, the truck side frame 10 is provided with the tension and compression members 12 and 14 merging adjacent their ends as at 16, being formed integral with the journal box 18 of the standard A. R. A. or any other type, said journal box being adapted to have cooperative relation with the wheel and axle assemblies 20, which may be of the standard friction type, Simplex type, roller bearing or any other type. The truck side frame is provided with spaced column guides 22 and connects the tension and compression members, the column guides being adapted to have guiding cooperation with the spaced columns 24 formed on the bolster 26, the bolster being preferably of truss or box girder construction and provided with the center bearing 28.

The upper member 30 of the bolster is provided with the spring seat 32 adapted to have cooperation with the spring clip 34 of the leaf spring assembly 36. The bolster is provided with the reenforcing web 38 forming a separating or positioning member for the pair of leaf spring assemblies 36. The inner ends of the leaf springs are seated on the spring seat 40 formed integral with the bottom chord 42 of the bolster and with the reenforcing web 38. The outer end of each leaf spring assembly is seated on the spring cap 44, the spring cap being provided with the upstanding flange 46 forming a spacing member for the leaf spring assemblies 36 and being provided with the column engaging members 47 for slidably guiding said caps. The spaced side frames 10 are connected by means of the spring plank 48, the outer ends of the spring plank being adapted to receive the nests of coil springs 50 on which the spring cap 44 is seated. The bolster is also provided at its ends with the members 52 for limiting vertical movements of the leaf springs, i. e., they form stops cooperating with corresponding members on the coil spring caps for limiting downward movement of the bolster and overstressing of the leaf springs.

In the construction shown in Figures 4 to 6 inclusive, the side frame 60 is also formed with tension and compression members 62 and 64 merging adjacent their ends as at 66 and preferably formed integral with the journal box 68 similar to the journal box 18 and cooperating with the wheel and axle assembly 20. The column guides 70 are formed integral with the tension and compression members, and are adapted to have guiding cooperation with the columns 72 formed on the spring cap 74. The spring cap 74 is seated on the nests of coil springs 76 which are seated preferably in wells 78 formed in that portion of the tension member disposed between the columns, the nests of springs being preferably spaced by means of the reenforcing web 80.

The bolster 82 is provided with the center bearing 84 and is preferably of truss or box girder construction, extending outwardly through the openings formed by the spaced columns 70. The bolster is provided with the stops 86 for limiting transverse movement of the bolster. The bolster is provided with the reenforcing web 88 which member is provided with the seats 90 aligned with the seats 92 provided on the side of the bolster, said seats being adapted to receive the head 94 of the link 96, the web also providing a spacing member for the leaf spring assemblies 98.

The inner ends of the leaf spring assemblies 98 are pivoted on the head 100 of the links 96, and the spring clip 102 is adapted to be seated on the spring cap 104, the spring cap 104 and the upper member 106 of the bolster being provided on its under side with facing roller seats 108 and 110 adapted to receive the rollers 112 whereby a centering device is provided. The outer ends of the leaf springs 98 are seated on the seats 114 provided on the spring cap 74, the spring cap being also provided with the spacing flange 116 disposed between the groups of leaf springs.

The bolster is provided with members 118 and 120 for limiting the vertical movements of the bolster, and the side frame is provided with the flange 122 to which the spring plank or tie 124 is secured for tying the side frames together.

With the construction shown, helical springs are used with leaf springs in such a manner that the building up of oscillations will be prevented without in any manner interfering with the free functioning of the springs, the leaf springs absorbing the energy of excessive oscillatory motions while the coil springs are unhindered from dissipating light shocks or rapid motion.

It is to be understood that I do not wish to be limited by the exact embodiments of the device shown which are merely by way of illustration and not limitation, as various and other forms of the device will of course be apparent to those skilled in the art without departing from the spirit of the invention or the scope of the claims.

I claim:

1. In a truck, the combination of a side frame having a tension and a compression member and spaced column guides, a bolster extending into the opening provided between said guides, a spring cap disposed between and guided by said guides, said spring cap engaging said guides, a coil spring supporting said cap on said tension member, and a leaf spring supporting said bolster from said cap, said leaf spring being disposed transversely of said truck.

2. In a truck, the combination of a side frame having a tension and a compression member and spaced column guides, a bolster extending into the opening provided between said guides, a spring cap disposed between and guided by said guides, said spring cap engaging said guides, a coil spring supporting said cap on said tension member, and a leaf spring supporting said bolster from said cap, one end of said leaf spring being supported on said bolster.

3. In a truck, the combination of a side frame having a tension and a compression member and spaced column guides, a bolster extending into the opening provided between said guides, a spring cap disposed between and guided by said guides, said spring cap engaging said guides, a coil spring supporting said cap on said tension member, and a leaf spring supporting said bolster from said cap, one end and another portion of said leaf spring being in engagement with said bolster.

4. In a car truck, the combination of a side frame having columns, a truck bolster provided with an opening in each end at the bottom, a semi-elliptic spring mounted longitudinally therein, rollers and mounting for same between the bolster and the spring band, the inner end of the spring retained by a swing link mechanism allowing the bolster to move longitudinally, the outer end of said spring supported by a spring cap resting on a nest of coil springs supported on said side frame, said spring cap being guided in its up and down movement by the columns, and projections or contact areas on the bolster and spring cap by which the said semi-elliptic spring is limited in its deflection.

5. In a car truck, the combination of a side frame having tension and compression members and integral connecting columns, a truck bolster provided with an opening in each end at the bottom, a semi-elliptic spring mounted longitudinally therein, rollers and means for mounting the same between the bolster and spring band, the inner end of the spring retained by a swing link mechanism allowing the bolster to move longitudinally, the outer end of said spring supported by a spring cap resting on a nest of coil springs, said springs being supported by the bottom portion of the tension member of the side frame, said spring cap being guided in its up and down movement by the columns, and projections or contact areas on the bolster and spring cap by which the said semi-elliptic spring is limited in its deflection.

6. In a truck, the combination of a side frame having a tension and a compression member, and spaced column guides, a bolster extending into the opening provided between said guides, a spring cap disposed between and guided by said guides, a coil spring supporting said cap on said tension member, a leaf spring disposed between said coil spring and said bolster, and anti-friction members disposed between a portion of said leaf spring and said bolster.

7. In a truck, the combination of a side frame having a tension and a compression member and spaced column guides, a bolster extending into the opening provided between said guides, a spring cap disposed between and guided by said guides, a coil spring supporting said cap on said tension member, a leaf spring disposed between said coil spring and said bolster, and anti-friction members disposed between a portion of said leaf spring and said bolster, one end of said leaf spring being swingably mounted on said bolster.

8. In a truck, the combination of a side frame having a tension and a compression member and spaced column guides, a bolster extending into the opening provided between said guides and having means engaging said guides, a spring cap disposed between and guided by said guides, said spring cap engaging said guides, a coil spring supporting said cap on said tension member, and a leaf spring supporting said bolster from said cap, said leaf spring engaging said bolster at a plurality of points.

9. In a truck, the combination of a side frame having a tension and a compression member and spaced column guides, a bolster extending into the opening provided between said guides and having means engaging said guides, a spring cap disposed between and guided by said guides, said spring cap engaging said guides, a coil spring supporting said cap on said tension member, and a leaf spring supporting said bolster from said cap, one end of said leaf spring being supported on said bolster.

10. In a truck, the combination of a side frame having a tension and a compression member and spaced column guides, a bolster extending into the opening provided between said guides and having means engaging said guides, a spring cap disposed between and guided by said guides, said spring cap engaging said guides, a coil spring supporting said cap on said tension member, and a leaf spring supporting said bolster from said cap, one end and another portion of said leaf spring engaging said bolster.

11. In a truck, the combination of a side frame having column guides, a nest of coil springs mounted on said side frame, a spring cap resting on said nest of coil springs and being guided in its up and down movement by contact with said column guides, a bolster provided with an opening in the end thereof at the bottom, and a semi-elliptic spring mounted longitudinally therein and supported on said spring cap.

12. In a truck, the combination of a side frame having column guides, a nest of coil springs mounted on said side frame, a spring cap resting on said nest of coil springs and being guided in its up and down movement by contact with said column guides, a bolster provided with an opening in the end thereof at the bottom, and a semi-elliptic spring mounted longitudinally therein and supported on said spring cap, said bolster and spring cap being provided with engageable projections or contact areas for limiting the deflection of said semi-elliptic spring.

13. In a truck, the combination of a side frame, a bolster, a coil spring, a leaf spring having three points of connection, two points connecting said leaf spring to said bolster, and a third point connecting said leaf spring to said side frame through said coil spring, and lateral motion means interposed between said leaf spring and bolster.

14. In a truck, the combination of a side frame, a bolster, a coil spring, a leaf spring having three points of connection, two points connecting said leaf spring to said bolster, a third point connecting said leaf spring to said side frame through said coil spring, and lateral motion means interposed between the bolster and leaf spring at the two points of connection between said bolster and leaf spring.

15. In a car truck, the combination of a side frame, a bolster engaging a portion of said side frame, springs of different character disposed in series and supported on said side frame, one of said springs being disposed transversely of said truck, and lateral motion means interposed between said springs and bolster.

16. In a car truck, the combination of a side frame, a bolster engaging a portion of said side frame, a leaf spring engaging said bolster at a plurality of points, a coil spring interposed between a portion of said leaf spring and side frame, and lateral motion means interposed between said leaf spring and said bolster.

17. In a car truck, the combination of a side frame, a leaf spring disposed transversely thereof, a load carrying member mounted for lateral movement on said leaf spring and engaging a portion of said side frame, and a coil spring interposed between a portion of said leaf spring and side frame.

18. In a car truck, the combination of a side frame, resilient means disposed transversely thereof, a load carrying member mounted for lateral movement on said resilient means and engaging a portion of said side frame, and resilient means of different character from said first named resilient means interposed between a portion of said first named resilient means and side frame.

19. In a car truck, the combination of a side frame, resilient means disposed transversely thereof, a load carrying member mounted for lateral movement on said resilient means and engaging a portion of said side frame, and resilient means of different character from said first named resilient means interposed between said load carrying member and said side frame.

20. In a bolster, the combination of tension and compression members, one of said members having a center bearing thereon, spaced side walls connecting said tension and compression members, and a strut connecting said tension and compression members between said walls, said strut having a seat thereon intermediate said tension and compression members for accommodating lateral motion means.

21. In a bolster, the combination of tension and compression members, one of said members having a center bearing thereon, spaced side walls connecting said tension and compression members, and a strut connecting said tension and compression members between said walls, said strut having a seat thereon intermediate said tension and compression members, said seat extending to and being integral with one of said walls.

22. In a bolster, the combination of tension and compression members, one of said members having a center bearing thereon, spaced side walls connecting said tension and compression members, and a strut connecting said tension and compression members between said walls, said strut having a seat intermediate said tension and compression members on each side of said strut.

23. In a bolster, the combination of tension and compression members, one of said members having a center bearing thereon, spaced side walls connecting said tension and compression members, and a strut connecting said tension and compression members between said walls, said strut having a seat on each side thereof intermediate said tension and compression members and extending to and being integral with the adjacent wall.

24. In a bolster, the combination of tension and compression members, one of said members having a center bearing thereon, spaced side walls connecting said tension and compression members, a strut connecting said tension and compression members between said walls, said strut having a seat on each side thereof intermediate said tension and compression members and, a seat on each of said walls aligned with said first named seats.

25. In a bolster, the combination of tension and compression members, one of said members having a center bearing thereon spaced side walls connecting said tension and compression members, a strut connecting said tension and compression members between said walls, said strut having a seat on each side thereof, a seat on each of said walls aligned with said first named seats, said seats being intermediate said tension and compression members, and another seat disposed on said bolster adjacent said strut said seats being adapted to accommodate lateral motion means.

Signed at Chicago, Illinois, this 29th day of June, 1931.

FREDERIC H. BENDER.